Feb. 20, 1962    N. J. HUGHES    3,021,537
METHOD OF SKIVING A T-NUT
Filed April 23, 1959    2 Sheets-Sheet 1

Inventor:
Norman J. Hughes,
by Walter S. Jones
Att'y.

Feb. 20, 1962 N. J. HUGHES 3,021,537
METHOD OF SKIVING A T-NUT
Filed April 23, 1959 2 Sheets-Sheet 2

Inventor:
Norman J. Hughes,
by Walter P. Jones
Att'y.

United States Patent Office 3,021,537
Patented Feb. 20, 1962

3,021,537
METHOD OF SKIVING A T-NUT
Norman J. Hughes, Melrose, Mass., assignor to United-Carr Fastener Corporation, Cambridge, Mass., a corporation of Delaware
Filed Apr. 23, 1959, Ser. No. 808,502
1 Claim. (Cl. 10—86)

My invention relates to an improved method of forming an attaching device having a barrel portion with an internal wall of one diameter for a portion of its length and a larger diameter for the remaining portion of its length which comprises skiving a portion of the barrel portion in the same machine as is used to form the fastener up to the barrel portion.

A specific object of my invention is to provide a method of forming an internal counterbore in a cylindrical nut which is to be internally tapped.

A further object of my invention is to provide a method of internally skiving and piercing a nut so as to eliminate a costly, secondary operation of counterboring as presently used in the art.

A still further object of my invention is to provide a method whereby an internally skived and pierced internally threaded nut may be formed automatically by drawing a cup shaped form in a manner old in the art, piercing it, internally skiving it to form a shoulder and piercing a portion of the shoulder thereby having a part that could only be made previously by the secondary operation of the counterboring.

Other objects of the invention will, in part, be obvious, and will, in part, appear hereinafter.

In the drawing which illustrates a preferred form of my invention:

Figure 4:
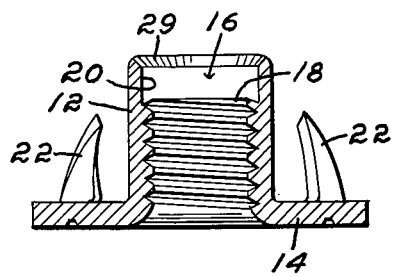
FIG. 4 is a section taken on line 4—4 of FIG. 3.

Referring to the drawing, the numeral 10 designates a preferred embodiment of the nut which may be produced by applicant's method. The nut 10 comprises a tubular body portion 12 open at the ends and threaded in the interior thereof, as shown in FIG. 4, and a base flange 14. The tubular body portion 12 comprises an inside wall 16 which is divided into two portions, a threaded portion 18 and an unthreaded portion 20. Nuts of this type are well known in the art and have been manufactured first with the inside wall 16 unthreaded in a conventional type of metal working press and by counterboring and secondary spreading operations. The tubular body portion 12 was tapped in the various types of machines available for this purpose. Integral with and in substantially spaced parallel relationship with the axis of the tubular body portion 12 are bayonet or knife shaped projections 22 which are integral with and in substantially right angle relationship to the base flange 14. The bayonet shaped projections 22 can be forced into a support 24 much as a nail is driven into wood, to hold the nut firmly against the support 24. Unfortunately, if the support 24 is subject to vibration or other violent movement, the projections 22 often work loose and unless some other method were also used to hold the nut 10 to the support 24, the nut would either fall out or become seriously loosened. It was therefore suggested that a portion of the wall 16 be so constructed that it could be easily bent to form a flange after the nut was engaged with a support in the manner illustrated in FIG. 5, and this flange would securely hold the nut to the support. However, where the tubular body or barrel 12 was internally threaded, it was found that you could not roll the terminal end of the barrel farthest from the base flange without seriously injuring the pitch of the threads in the barrel. Therefore, it was necessary to perform secondary operations on the nuts such as a separate counter bore operation to thin the unthreaded portion 20 so that it could be bent to form the required flange without injuring the pitch of the thread. Naturally, any secondary operation is an expensive proposition both in regards to time and money.

Figure 3:
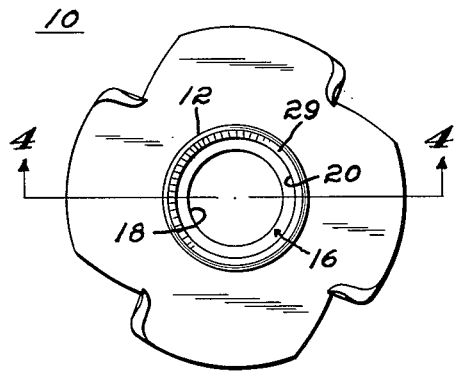
FIG. 3 is an enlarged top plan view of the nut which may be formed by applicant's method.
Figure 5:
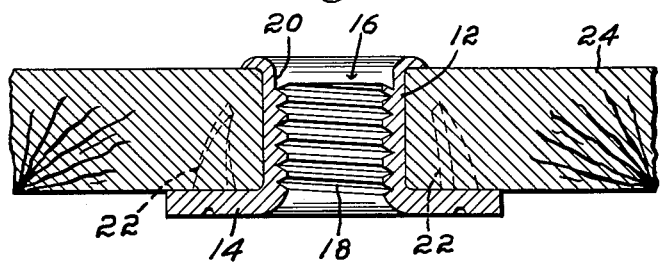
FIG. 5 is a view of the nut shown in FIG. 4 applied to a support which is also shown in section.

The old method of forming a nut of the type shown in FIGS. 3 to 5 or for that matter, any threaded flanged tubular body of this general type on a mechanical press was first to draw the tubular body portion 12 through the use of normal drawing and redrawing operations. The base flange 14 and projections 22 were then formed and the closed end was pierced. The nut was then removed from the press for secondary operations such as counter boring of the unthreaded portion 20 through the use of a counter bore tool and tapping of the thread portion 18. The projections 22 may (if desired) be formed as a secondary operation. Obviously the use of the counter bored or skived part of the wall numbered 20 allowed the manufacturer, in certain applications, to do away with the necessity of other attaching means such as the projections 22. The new method which is herein disclosed follows the same procedure as the old method up to the point where the tubular body portion is pierced to form two open ends.

Figure 1:
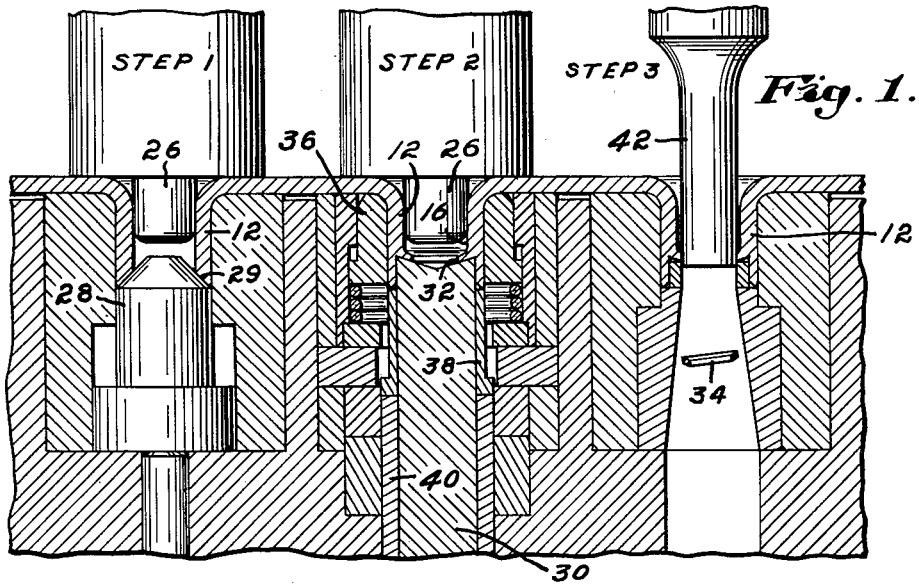
FIG. 1 is an enlarged section of three stages of the part being made on a press, more specifically a pillar press, with the punches down.
Figure 2:
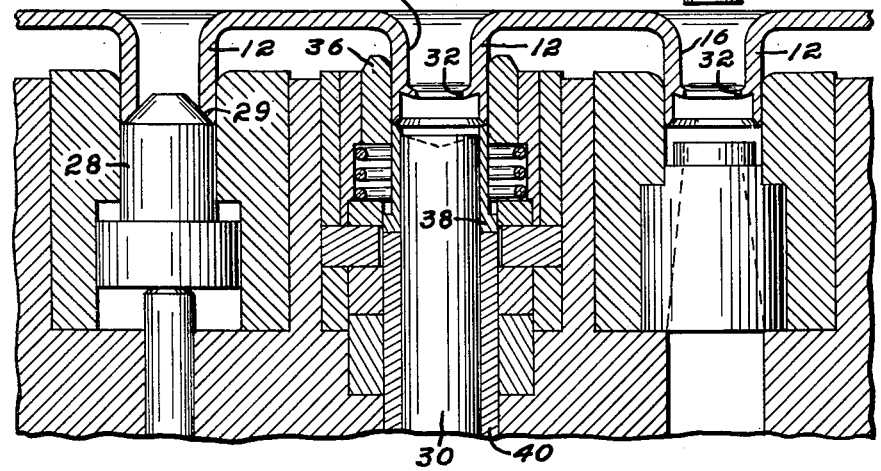
FIG. 2 is a section as shown in FIG. 1 with the punches up.

Referring now specifically to FIGS. 1 and 2, after the piercing operation mentioned, the applicant proceeds with the operations illustrated in FIGS. 1 and 2 and more specifically numbered step 1, step 2, and step 3. The first step shows a pilot or sizing punch 26 which holds the tubular body portion 12 to a specific diameter while a suitable tool 28 forces the terminal end 29 of the tubular body portion 12 to an angle with the axis of the said body portion 12.

Moving to step 2, the next operation performed on the nut is to have a skiving tool 30 whose cutting face is in the form of a cone shaped dish, skive or slice a portion of the inside wall 16 into a circumferential shoulder 32 which projects inwardly toward the axis of the body portion 12. The length of this skiving is, of course, predetermined, but the skiving operation forms the circumferential shoulder 32 which consists of metal moved inwardly during this operation. During the skiving operation, tool 30 is held stationary and the body portion 12 is guided to the skiving tool by a spring loaded bushing 36 that supports the nut while the actual skiving operation is taking place. The nut is stripped from the skiving tool by a stripper bushing 38 actuated by a push rod 40 driven by a pressure pad, which has not been shown.

In order to remove a portion of the circumferential shoulder 32, which would interfere with tapping, it is necessary to perform a second piercing operation shown as step 3 which removes a terminal edge portion 34 by what may be considered a shaving process through the use of a piercing punch 42 and provision is made in the die, as illustrated in FIGS. 1 and 2 (step 3), to allow the portion 34, formed by this shaving process to drop off.

The nut may then be completed with any desirable embossments or projections and then removed from the press and tapped.

It should be obvious to those familiar with the art that any number of different mechanical presses may be used, such as a pillar press, an eyelet machine or a multi-slide press.

Since certain other obvious modifications may be made in this device without departing from the scope of the invention, it is intended that all matter contained herein be interpreted in an illustrative and not in a limiting sense.

I claim:

A method of forming a sheet metal nut having a bore surrounded by a wall, said bore having a first portion of lesser diameter than the remaining portion, said first portion being threaded, said portions separated from each other by an internal circumferential shoulder which comprises the steps of drawing a tubular body having an external and internal wall and being open at both ends, internally supporting a substantial length of said body at the first of said ends, chamfering said internal body toward the axis of said tubular body at the other end thereafter, forcing said chamfered internal wall against a shallow annular cutting die at a predetermined point from said other end to skive an annular portion toward said first end while internally supporting said first end, thereby forming said internal circumferential shoulder, then piercing said annular portion to substantially remove the burr formed by the skiving operation and thereafter internally threading said first portion.

References Cited in the file of this patent

UNITED STATES PATENTS

| | | |
|---|---|---|
| 1,714,316 | Oakley | May 21, 1929 |
| 2,255,948 | Swanstrom | Sept. 16, 1941 |
| 2,346,456 | Ruthven | Apr. 11, 1944 |
| 2,661,663 | Brinkman | Dec. 8, 1953 |

FOREIGN PATENTS

| | | |
|---|---|---|
| 936,487 | Germany | Dec. 15, 1955 |